Sept. 14, 1965  S. N. HOWELL  3,206,596
HOT BOX DETECTOR

Filed July 5, 1957  4 Sheets-Sheet 1

INVENTOR.
SABERT N. HOWELL
BY
*Mitchell & Bechert*
ATTORNEYS

FIG. 10A

INVENTOR
SABERT N. HOWELL

BY

ATTORNEYS

United States Patent Office 3,206,596
Patented Sept. 14, 1965

3,206,596
HOT BOX DETECTOR
Sabert N. Howell, Huntington, N.Y.
(% Servo Corporation of America, New Hyde Park, N.Y.)
Filed July 5, 1957, Ser. No. 670,348
1 Claim. (Cl. 246—169)

This invention relates to trackside-mounted hot-box-detecting equipment, for use in detecting overheated journal-end conditions before achievement of a temperature considered dangerous to the safety of a passing railroad train. This application is concerned with improvements over the invention disclosed in copending patent application Serial No. 349,826, filed April 20, 1953, now abandoned, and this application is a continuation-in-part of my copending application Serial No. 506,125, filed May 5, 1955, now abandoned.

Hot-box problems have plagued railroad operators for years, and in spite of the many advances in science and in the aplication of these advances to railroad operation, the hot box has remained a major source of expense in railroad operation. The annual loss occasioned by hot boxes runs into hundreds of millions of dollars. One car can derail an entire train, since an undiscovered hot box can actually melt the wheel from the axle. Whenever hot boxes are discovered, the defective car must be immediately "set out" from the train, before it can do serious damage. Such set-outs, which cause delays and added expense, averaged almost 11,000 per month in 1954. These figures are not likely to decrease under the pressure of competition to make faster and longer runs which can only aggravate the hot-box problem.

It is, accordingly, an object of the invention to provide improved means whereby potential hot-box conditions may be detected long before these conditions become serious.

It is another object to provide improved means utilizing infrared techniques whereby hot-box conditions on a passing train may be detected throughout the full range of normal speeds of any passing train.

It is also an object to provide means meeting the above objects and furnishing automatic warnings, indications, or records, so as to simplify the problem of identifying the car which must be set out.

Another object is to meet the above objects with means whereby the traffic-handling procedures may be improved for accommodating cars to be set out.

A further object is to provide hot-box-detector equipment of the character indicated in which a potential hot-box condition may be detected sufficiently early to permit appropriate quick maintenance of the troublesome journal end without necessarily requiring that the vehicle be set out and without materially altering the schedule for the train.

A still further object is to provide trackside-mounted hot-box-detector equipment which will function to detect a given temperature rise above ambient rather than some particular absolute temperature, whereby reliable operation under extremes of temperature and of exposure to sun and other weather conditions may be achieved.

Other objects and various further features of novelty and invention will be pointed out or will occur to those skilled in the art from a reading of the following specification in conjunction with the accompanying drawings. In said drawings, which show, for illustrative purposes only, preferred forms of the invention.

Briefly stated, the invention contemplates railroad hot-box-detecting equipment comprising trackside-mounted heat-responsive means including, for each unit, a heat-responsive cell and means directionally aligning said cell for response primarily at the horizontal elevation of passing car-journal boxes. The response is directed predominantly transverse to the track so that within a range of wheel diameters, accommodating, for example, all freight cars or all passenger cars, the journal boxes successively pass through the response field of the cell. In order to eliminate false signals identified with hot brake shoes, open hoses, and the like, I provide shutter means for temporarily activating the heat-responsive means; the shutter means includes a trip permanently mounted at the track to derive a shutter-actuating signal only when a passing wheel center is in the response field of the cell. I show alternative forms of trip mechanism for this purpose.

In order to eliminate cell signals which do not represent dangerous or potentially dangerous conditions. I provide in the signal-processing circuitry a threshold circuit adjusted to yield an output only upon occurrence of a signal representing a dangerous or a potentially dangerous condition. The threshold circuit is described herein as operating each of several kinds of alarm device, whereby remedial measures may be immediately taken; the threshold circuit may also operate a suitable transmission link whereby a traffic-control center at a remote location may be promptly informed not only of the existence of a hot box on a train, but also of the identity of the axle and of the axle end for which the hot-box condition exists.

Figure 1:
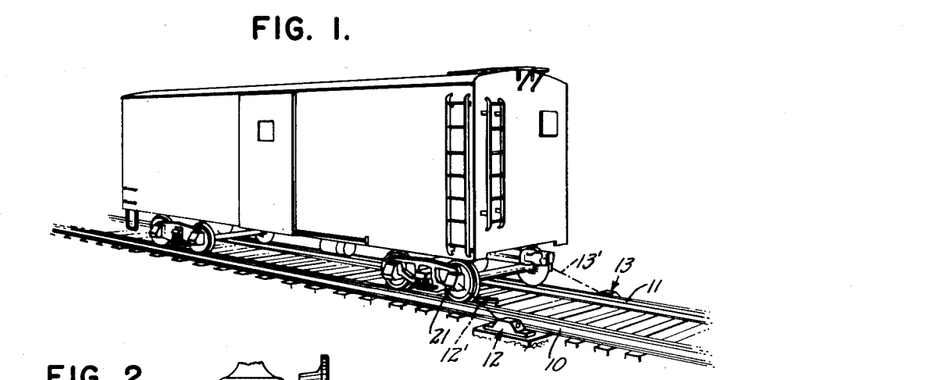
FIG. 1 is a perspective view of a section of track with a freight car, one axle of which is shown passing twin detector installations of the invention.

Referring to FIG. 1 of the drawings, my invention is shown in application to a section of track including rails 10–11. Twin detector housings 12–13 are mounted on opposite sides of the track at essentially the same longitudinal locations along the track. The detector units may be installed in rugged housings, set on the ends of crossties or set permanently on concrete bases 14 (FIG. 2), in keeping with conventional railroad practice.

Each of the units 12–13 may include a heat-responsive capsule or cell 15 rigidly fixed on a support 16 and of the general charcter disclosed in greater detail in said co-pending patent application. Such cells may employ one of a variety of materials, but I indicate my preference that the capsule 15 shall employ flakes of thermistor material, one flake (for the case of detector unit 12) being exposed along the response axis 12' the other flake being shielded and serving to provide an ambient-temperature reference against which the incoming signals are evaluated.

Figures 1, 2, 3:
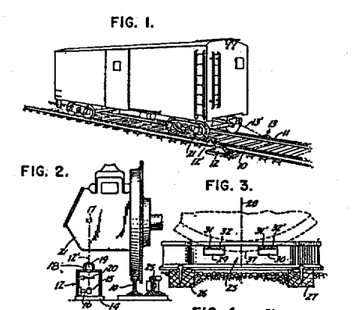
FIG. 2 is an enlarged fragmentary side view, taken substantially in vertical sectional planes transverse to the track, the track being shown in section in the plane of the axle, and the detector being shown in section in a plane offset from the plane of the axle.
FIG. 3 is an enlarged fragmentary view in longitudinal elevation of trip mechanism associated with the detector equipment of FIGS. 1 and 2.
Figure 2:
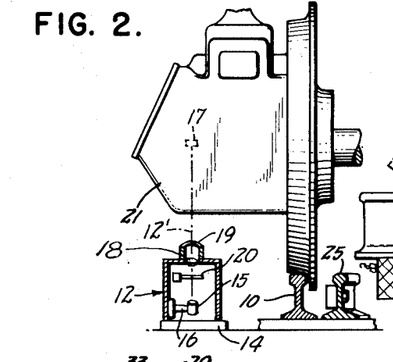
Figure 2:
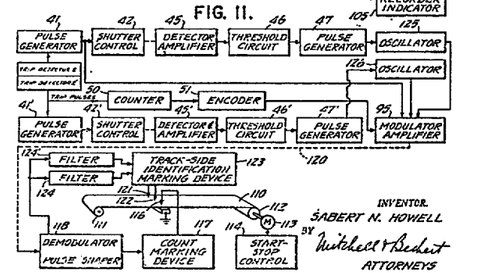
Figure 3:
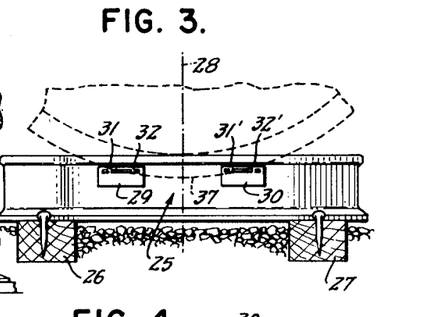

For best results, assuring response primarily on the axis 12', I prefer to use focusing optics including a lens 18 of infrared-transmitting material, as of arsenic-trisulfide glass; a hood 19 shields the lens 18, and shutter means 20 is shown positioned for temporarily activating the heat-responsive means 15. The detector unit 12 is shown directionally aligned with the ends of passing journal boxes, such as the box 21, the viewing aspect being slanted and upward and directed at the bottoms and at corresponding side walls of such boxes 21. It will be understood that, even with a spacing of several feet between the lens 18 and the observed journal box 21, the response field of the active flake of the cell 15 may be relatively small, as suggested by the lightly framed area 17, representing a momentary imaging of the active flake on a side wall of box 21, as the box 21 passes the unit 12.

In FIG. 1 the corresponding active thermistor flake for the detector unit 13 is shown to have a directionally aligned response axis 13', again directed at the bottoms and corresponding sides of passing journal ends, but on the other side of the track 10–11.

In accordance with a feature of the invention, I provide wheel-operated trip means permanently mounted at the track for actuating the shutter 20 so as to expose cell 15 only when corresponding journal ends occupy the fields of view on axes 12'–13'. By this means, I automatically exclude the possibility of spurious-signal development at cell 15, even though the sources (e.g., steam hoses, etc.) of such spurious signals might be substantially more intense than the heat radiated by the journal ends themselves.

Figure 4:
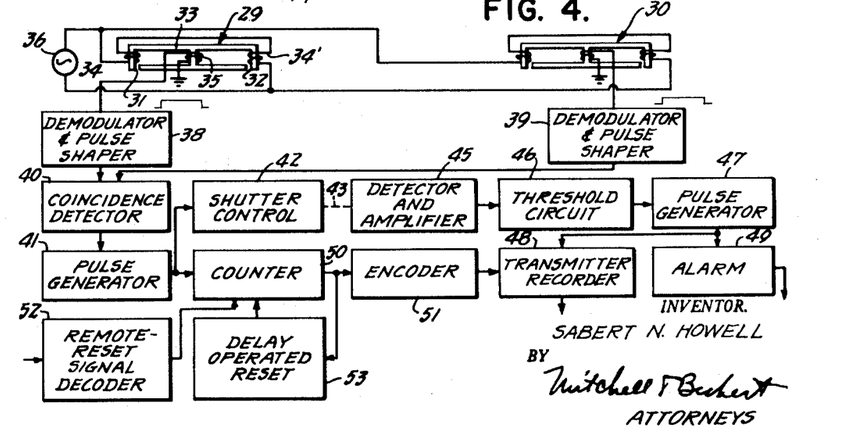
FIG. 4 is an electrical diagram schematically indicating component parts of a detector of my invention.

In FIGS. 3 and 4, I illustrate a particular kind of trip mechanism, utilizing electromagnetic-detection means, and wherein passage of a wheel develops a change in magnetic flux, giving rise to a shutter-control pulse. In FIG. 3, such trip mechanism is incorporated in a special short guide-rail section 25 mounted on two adjacent ties 26–27 and immediately adjacent one of the rails (10) of the track. For certain cases, a single trip device may suffice, and in such event, the trip device on rail 25 would be positioned in that vertical plane 28 for which the response axis 12' of the detector unit 12 (and 13' for unit 13) is aligned as indicated at 17 in FIG. 2. However, in the form shown, twin trip devices 29–30 are employed, the placement thereof being longitudinally symmetrical with respect to the plane 28.

Each of the trip devices may be based on or contained in a rugged non-magnetic housing, and so positioned as to expose one or more magnetic air gaps 31–32–31'–32'. As best seen in FIG. 4, the gaps 31–32 are developed at longitudinally spaced locations on an E-shaped magnetic core, defining two flux-loop paths. The core 33 is symmetrically excited by coils 34–34' coupled to the outer legs and energized by an A.C. source 36 of sufficiently high frequency to be modulated with clearly discernable pulses identifying passage of a wheel flange successively at the gaps 31–32, for the highest anticipated passing-train speed. The trip pick-up 30 may be of similar construction and may be energized in parallel with the trip 29, so that separate pulses or modulations on the wave train of the carrier frequency produced by source 36 are achieved as a wheel successively passes the gaps 31–32–31'–32'.

The pick-up elements 29–30 form part of a mechanism for discriminating as to the size of the car wheels so that, for example, the detectors 12–13 may be caused to respond essentially only to the journal ends of freight cars; for all freight cars, wheel diameter varies relatively little, regardless of wear. I prefer so to place the pick-up elements 29–30 with respect to the response plane 28 that the gaps 31–32' will always straddle the intercepts of a wheel flange 37 of a maximum expected diameter, and so that the spacing between gaps 32–31' will always be short of the intercepts of a wheel flange 37 of minimum expected diameter.

Under the described conditions, the output coil 35 of each pick-up element 29–30 will feed appropriate demodulator and pulse-shaper means 38–39, which in each case may include a multivibrator developing an elongated square wave. Such square wave, for the case of means 38, will have a leading edge identified with the time at which wheel flange 37 (proceeding from left to right in the sense of the drawing) passes gap 31, and a trailing edge identified with the time said flange 37 passes the gap 32. In like manner, the square wave developed by means 39 will have a leading edge identified with the time the flange 37 passes the gap 31', and a trailing edge identified with the time that the flange 37 passes the gap 32'.

When and only when the square waves developed at 38–39 overlap in time, a pulse generator 41 responds to a coincidence detector 40 to develop a pulse signal for actuating the shutter control 42, as for the shutter 20 of FIG. 2. Thus, as a wheel proceeding from left to right first develops a square wave at pick-up 29, there is no corresponding square wave developed at pick-up 30, and no shutter-control pulse will result. However, as the flange 37 first develops a square wave at pick-up 30, and if said flange 37 is in the range of diameters discussed above in connection with the placement of gaps 31–32–31'–32', then a second square-wave pulse will simultaneously be developed at pick-up 29. At this time, the wheel center is substantially at the trip plane 28 (including the response axis 12' or 13' of the detector cell), and this holds true regardless of the speed of the passing train. The shutter control 42 may therefore incorporate conventional exposure-timing means, determining an open-shutter interval of, say, 0.001 to 0.003 sec., for which the detector cell may respond only to the journal (as distinguished from other car parts), regardless of the speed of the passing train, as will be understood.

As indicated generally above, the means whereby the shutter control 42 temporarily activates the heat-responsive means or cell 15 may take a variety of forms. The simplest to visualize is one involving purely mechanical operation in a conventional camera shutter on the optical axis of the cell. Electron-optical shutters may also be employed, but these of course must be adapted to the transmission of infrared energy, and in such case a germanium prism may perform the function without involving the wear which would be characteristic of any mechanical shutter. Further alternatively, and as discussed in greater detail in connection with FIG. 8, the shutter control 42 may determine temporary amplifier response to the video signals developed by the detector cell. In view of the various alternative arrangements which may be employed for shutter control, I have merely schematically indicated in FIG. 4, at the dashed connection 43, that the means 42 performs the shutter function on the detector and amplifier 45, said detector and amplifier being understood to include the cell 15 or its equivalent.

In order that the output of my device shall not be clouded with signals representing less than a potentially dangerous hot-box condition, I show a threshold circuit 46 connected to the detector-amplifier 45 and operative to yield an output signal only when the detector 45 discerns a hot-box temperature representing an excessive rise above ambient. Thus, a pulse generator 47 may develop from the threshold circuit suitable signals for recording or transmitting at 48, or for activating an alarm, suggested at 49.

In order positively to identify the particular hot box giving rise to an operation of the threhold circuit 46, I show counter means 50 connected for response to the trip pulses provided by generator 41. The device 50 will thus count all axles on the train. The output of counter 50 may operate a recorder at the trackside installation of the detector 12, as suggested by legend at 48; in that event, it will be understood that the device 48, being also responsive to the threshold circuit 46, may provide a coordinated record whereby the particular count (available at 50) for which a threshold-circuit operation occurs, may be permanently identified on the recorder.

For remote-transmission purposes, it is more convenient to code the count at 50, as by encoding means 51 interposed between counter 50 and transmitter 48. Binary-coding techniques are well known and well suited to the purpose of coding the most rapid counts available from counter 50. The modulating and multiplexing methods employed at 48 for purposes of remote transmission may be conventional and will depend upon the type of remote-transmission link best suited to the existing signalling system along the railroad right of way. Such methods are therefore not disclosed in detail.

In order that axle locations may be adequately identified for each new train that passes through the hot-box monitoring point, represented by the location of detector 12, I provide means whereby the counter 50 may be reset after the complete train has passed the monitoring point. The means 52 involves suitable signal-decoding equipment whereby a remotely coded reset signal may be processed and applied to the counter 50 to reset the same in readiness for the next train. Alternatively, or in addition, automatic means suggested at 53 may respond to pulses available from generator 41 or from counter 50, and to an abnormal delay between successive pulses, such abnormal delay representing the minimum train speed for which my device is responsive. Detection of the abnormal delay between trip pulses may automatically develop (at 53) a counter-reset signal, as will be understood.

Figure 5:
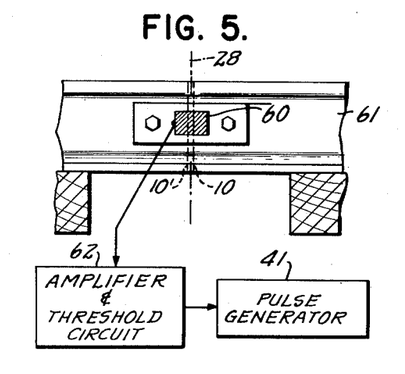
FIGS. 5 and 6 are enlarged fragmentary views in longitudinal elevation showing alternative trip mechanisms.
Figure 6:
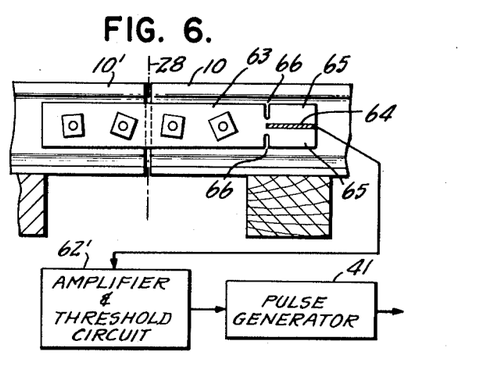

In FIGS. 5 and 6, I show alternative trip mechanisms for use in place of the devices 29-30 of FIGS. 3 and 4. In the arrangement of FIG. 5, a simple microphone or acoustic transducer 60 is suitably carried, as on the underside of the bottom flange or on one side of the guide-rail web 61. The rail 61 is so placed with respect to the continuous rail 10 as to align the same substantially with the break between two rail sections 10-10' so that, as each successive wheel is transferred from riding the rail section 10 to riding the rail section 10', the characteristic "click" may provide a strong acoustic signal, detected at 60 for trip operation. The signal-processing means may include an amplifier and threshold circuit 62 operating the pulse generator 41 which has already been described in connection with FIG. 4, it being understood that the threshold circuit 62 is set for a level which determines operation of pulse generator 41 only for signals of a magnitude and frequency identified with the click at rail break 10-10'.

In FIG. 6, the trip mechanism is caused to be operated by the characteristic deflection of the fishplate 63, joining the two rail sections 10-10'. The transducer element 64 is shown inserted between and bonded to forked arms 65 at one end of the fishplate, and the electrical output of transducer 64 is supplied to amplifier and threshold circuitry 62' analogous to that already described; if desired, slots 66 in plate 63 may allow freer suspension of arms 65, thereby providing greater electrical response by virtue of inertial bending of arms 65. Again, the operation of circuit 62' may generate the trip pulse at 41 for operation of the shutter control and counter, as described in connection with FIG. 4.

Figure 7:
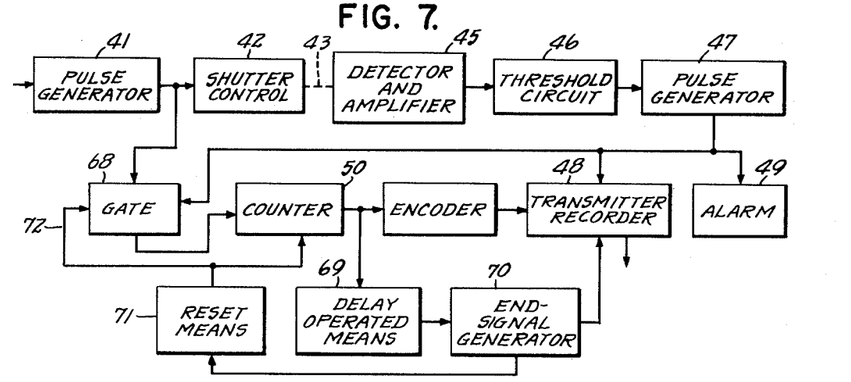
FIG 7 is an electrical diagram illustrating alternative components for some of the parts of FIG 4.

In the arrangement of FIG. 7, functioning is generally similar to that described for FIG. 4, except that instead of counting successive train wheels beginning at the front end of the train (as in FIG. 4), the device of FIG. 7 does not begin to count until the first operation of the heat-detector threshold circuit 46. In order to achieve this function, a gate 68 is interposed between the wheel-trip pulse generator 41 and the counter 50. The gate is normally closed so that the counter 50 does not function, but so that the shutter control 42 may function in the previously described manner. Upon detection of a hot box, as when the threshold circuit passes a signal to the pulse generator 47, the output of generator 47 is fed (as before) to the transmitter recorder 48 and to the alarm means 49; but, in addition, this output is also delivered to the gate 68, to control an opening of the gate and a commencement of operation of the counter 50. The gate 68 will thereafter remain open, so that the counter 50 may register wheel count to the end of the train. Upon detection of an abnormal delay between count impulses, as by delay-operated means 69, said abnormal delay representing a train speed slower than the minimum to which the device is to respond, a characteristic signal is delivered to an end-signal generator 70 in modulating relation with the transmitter-recorder 48, so that the end of the train may be unmistakably marked on the recorder or on the remote transmision. At the same time, reset means 71 may respond to a functioning of delay means 69 (or of generator 70) to reset the counter 50 and to close the gate 68, as suggested by the connection 72.

Figures 8, 9:
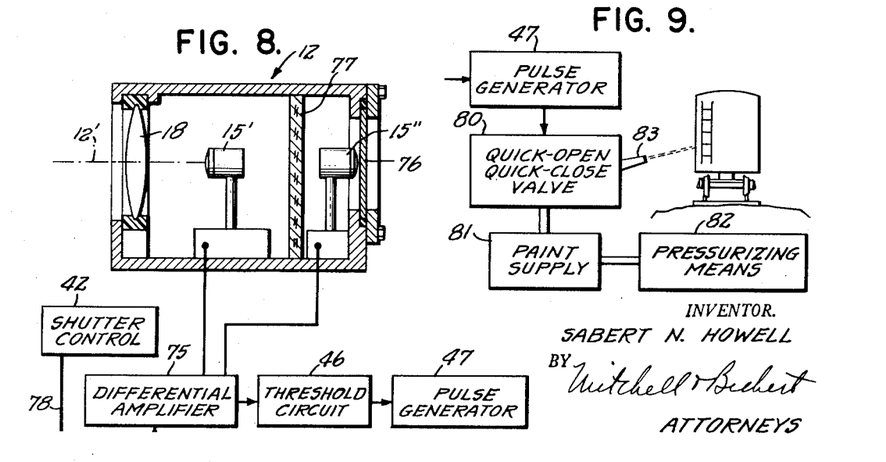
FIG. 8 is a diagram schematically indicating optical and electrical parts of an element of FIG. 4.
FIGS. 9 and 9A are diagrams schematically indicating alternative alarm devices more fully illustrative of parts so designated in FIGS. 4 and 7.

As indicated in the description of cell or capsule 15 in FIG. 2, it is to be preferred that the heat detector comprise an element or elements responsive to the unknown source (as on the axis 12 or 13') and that a corresponding element or elements (not shown) be non-responsive on such axis and therefore responsive only to ambient-temperature conditions, the signal-processing circuitry being differentially responsive to the outputs of both elements. In FIG. 8, I show a particular arrangement of cell elements incorporating this feature and having important application in locations where wide extreme of temperature are encountered daily, as in desert areas.

In the arrangement of FIG. 8, the housing 12 includes a single cell element 15' mounted at the focus of infrared-transmitting optics 18 and yielding one of the two signals to be differentially evaluated at amplifier 75. The other or ambient cell element 15" is also connected to the amplifier 75 for differential evaluation against the output of cell 15', but the location of the ambient cell 15" is such as to reflect primarily surface temperatures on the housing 12, as at a thin panel or membrane 76 on the side directly opposite the response axis 12' of the optics. I show the provision of an insulating panel 77 between chambers in which the cells 15'-15" are mounted. The amplifier 75 may operate a heat-signal threshold circuit 46 and pulse generator 47, in the manner discussed in connection with FIG. 4, and in the form shown, the shutter control 42 is in direct controlling relation with amplifier 75 and is therefore directly connected thereto by means 78. It will be understood that the function of control 42 and connection 78 is normally to maintain amplifier 75 below cut off or, rather, such that heat signals from spurious sources will not operate the threshold circuit 46. Operation of the trip mechanism, however, transiently retores amplifier 75 to a preset gain setting, whereby the threshold circuit 46 may discriminate for hot-box temperature rises above ambient.

Figures 9A, 10:
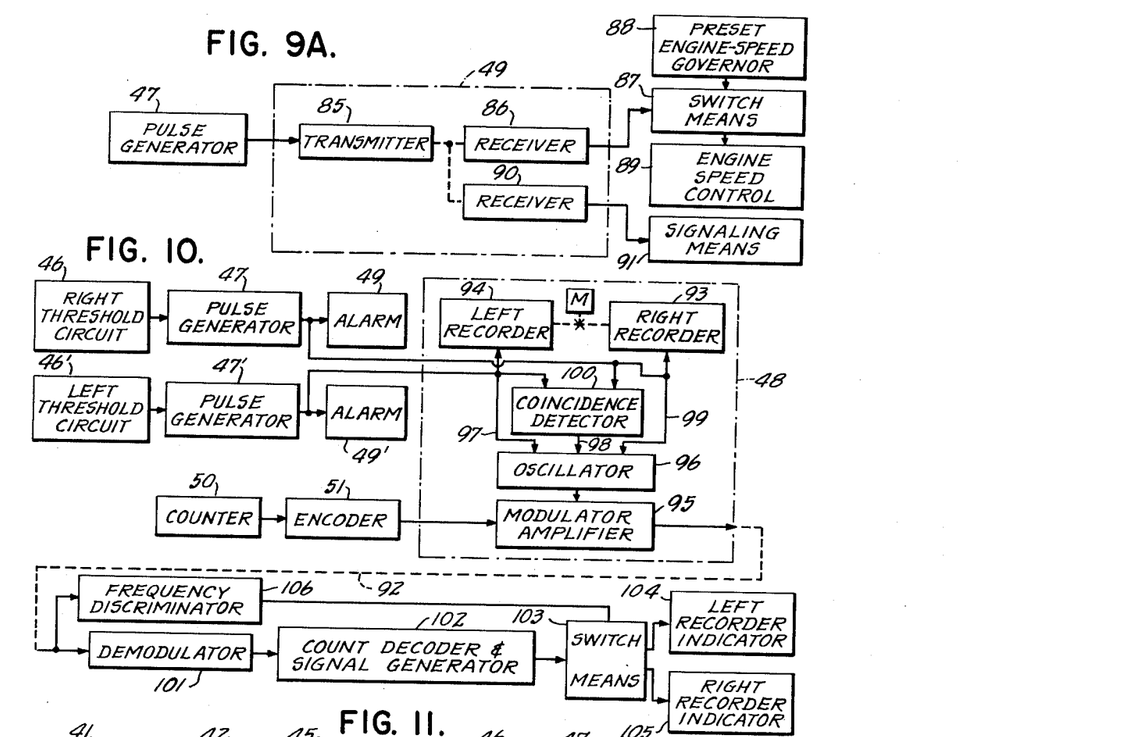
FIGS. 10, 10a and 11 are alternative electrical diagrams schematically indicating component parts of complete systems accommodating twin detectors (as shown in FIG. 1) and incorporating remote-transmission features.
Figure 9A:
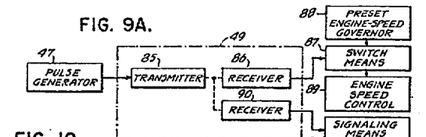

FIGS. 9 and 9A illustrate alternative alarm mechanisms which will be understood to function in either of the systems of FIGS. 4 and 7 and designated therein generally by the reference numeral 49. In the arrangement of FIG. 9, the pulse generator 47, which, it will be recalled, delivers a pulse only upon detection of a dangerous or of a potentially dangerous hot-box condition, transiently operates a quick-open quick-close valve 80 admitting a charge of marking paint from a reservoir 81 (pressurized by a source 82) to a discharge nozzle 83. Nozzle 83 may be mounted on the detector housing 12 and directly transverse to the track, so as to splash and thus mark the side of a passing vehicle sufficiently close to a detected hot box to provide unmistakable identification of the troublesome location.

In the arrangement of FIG. 9A, the alarm mechanism 49 again functions from the pulse generator 47, but is seen to include a transmission link involving a transmitter 85 and receiver 86. The link may be conductive or inductive or by radio, depending upon installed communications equipment, but the receiver 86 is in the cab of the engine of the train monitored by my equipment. Upon detection at receiver 86, the pulse developed by generator 47 is restored and is available for operation of switch means 87. Switch means 87 functions to shunt certain manual engine speed control 89 of engine speed and to supplant such control with that available from a preset engine-speed governor 88. The preset speed at governor 88 may be sufficiently low to enable the train to proceed safely to a maintenance or set-out location and so as to avoid further development of dangerous or potentially dangerous hot-box conditions. It will be understood that such control of speed may be fully automatic and that it may not be overridden by any manual control available to the engineer, but that of course flexible speed control is still available to the engineer, within the speed limit determined by the governor 88.

The diagram of FIG. 9A further suggests that the alarm 49 may include a further receiver 90 located ahead of the train as at conventional trackside-mounted signalling means 91, the connections being such as to cause receiver 90 to display a warning signal at 91 whenever the alarm 49 is tripped by pulse generator 47.

Figure 11:
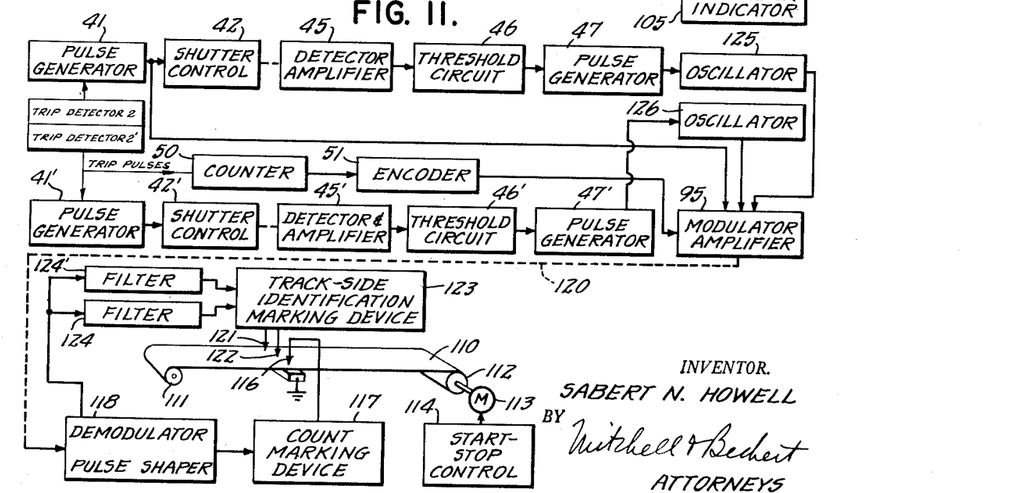

The arrangements of FIGS. 10 and 11 illustrate integraded-system operation whereby a single communication channel accommodates counting and heat-signal operations developed by both the two opposed detectors 12–13 at the same longitudinal location along the right of way. Each of the detectors 12–13 will be understood to incorporate components already described and thus it suffices in FIG. 10 merely to identify a "right" threshold circuit 46 and a "left" threshold circuit 46', being separate circuits associated respectively with detectors 12–13 and operating to derive an output signal only when subjected to a response representing an abnormal journal-box temperature condition.

Figure 10:
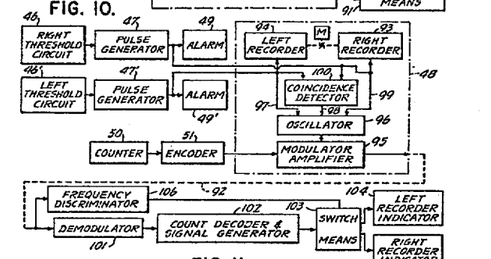
Figure 10A:
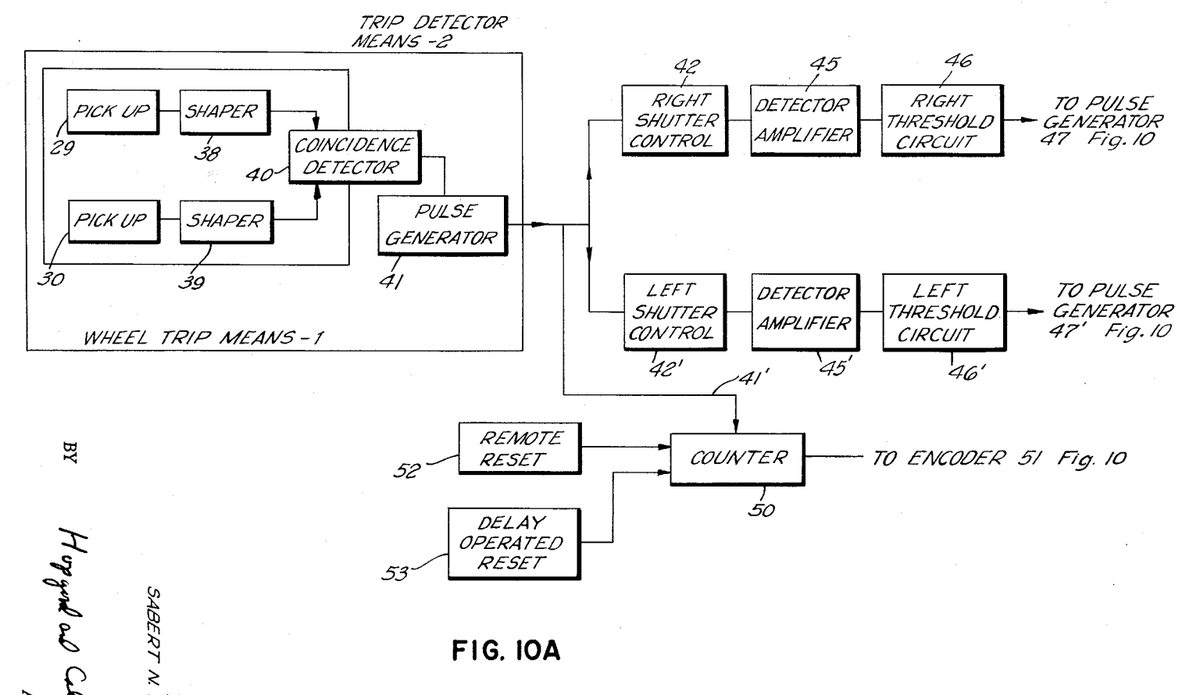

In FIGURE 10a, there are shown right threshold circuit element 46 and left threshold circuit element 46' which elements are also shown in FIGURE 10. The input to these elements comprises a wheel trip means 1 which contains the same sub-components as were identified previously in connection with FIGURE 4; i.e., the pick-up elements 29 and 30, the demodulator and pulse shaper elements 38 and 39 and the coincidence detector 40. These may be conveniently considered as a trip detector means 2 which feed into the pulse generator 41. The output of pulse generator 41 indicates the presence of a wheel, and the pulses thereof are applied to right shutter control means 42 and left shutter control means 42' which in turn feed respectively into detector amplifiers 45 and 45'. The remote reset means 52 and the delay operated reset means 53 are connected to counter 50 as shown as well in FIGURE 4 and the wheel presence signal is applied over conductor 41' (FIGURE 10a) to the counter.

Although the wheel trip means, shown as a single element, is positioned on one side of the track, if presence indicators are called for on both sides of the track, then the wheel trip means may be duplicated as will be apparent to those skilled in the art.

Circuits 46–46' supply pulse generators 47–47' for tripping alarm circuits or means 49–49', but a single transmitter 48 (and, therefore, a single communication link 92) serves both detectors. Since counting will be the same, regardless of the side of the track from which observations are made, a single counter, such as the counter 50 and encoder 51 (associated with the detector 12) may serve the same communication link 92.

In the arrangement shown, the transmitter includes "right" and "left" recorders 93–94 separately responsive to the pulse generators 47–47' and therefore locally recording all detected hot boxes. Transmitter 48 also includes a modulator 95 served by an oscillator 96 having inputs 97–98–99 determining different frequencies on which the coded signals will be modulated. The arrangement is such that, if for any particular shutter operation, a hot box is detected on one side of the train to the exclusion of the other, then lines 97 or 99, as the case may be, may be effective to determine one of two carrier frequencies. On the other hand, if hot boxes are detected at both ends of the same axle, a coincidence at detector 100 recognizes this fact and, by means of control line 98, determines a third frequency on which code signals will be modulated.

At the receiving end, demodulating means 101 may deliver signals to a count decoder and signal generator 102 for delivery via switch means 103 to a "left" recorder indicator 104 or to a "right" recorder indicator 105. A "right" recorder indicator 105. A frequency discriminator 106 responds to a particular one of the three possible carrier frequencies provided by oscillator 96 and functions to control switch means 103 to channel the decoded count into one or the other or both of indicators 104–105. Thus, the device of FIG. 10 may directly indicate or record the axle location and the train side responsible for all hot-box conditions.

In the arrangement of FIG. 11, a single simple recording mechanism records and identifies any and all hot boxes. This recorder uses a continuously moving strip 110 of recording paper, film, or the like delivered from a supply reel 111 to a take-up reel 112, under the control of a motor 113 governed by start-stop means 114; starting and stoping means are not individually shown in detail but will be understood to start driving reel 112 upon reception of first count pulses signifying the beginning of a train, and to stop reel 112 after detection of abnormal delay between count pulses, signifying complete passage of the train, such delay mechanism being shown at 69-70 in FIG. 7. The recorder is shown as of the stylus-marking variety, creating a permanent record or mark, for each electrical discharge through the paper 110 to grounding means 115. One of the three styli 116 is energized by count-marking means 117, the count marks being available from a demodulator and pulse shaper 118 at the remote end of the transmission link 120. The other two styli 121–122 identify the respective sides of the train on which hot boxes are detected and may be energized by suitable marking circuitry 123, governed by operation of frequency-selective filters 124–124', responsive to one of two possible carrier frequencies received over the link 120, said frequencies being uniquely identified with one side or with the other side of the train, and occurring only when a hot-box condition has been detected. The trip mechanism, the detector, the threshold circuits and the like may be as described above and, therefore, corresponding reference numerals have been applied to these circuit elements at the transmission end of the equipment. However, in FIG. 11, separate oscillators 125–126 are shown connected to modulator 95, and filters 124–124' are relied upon to select which of the styli 121–122 will be actuated with a recording original indicative of the side of the train on which a hot box is detected.

As shown in FIGURE 11, trip detectors 2 and 2' which comprise the elements grouped under the same number in FIGURE 10a apply suitable presence signals to the respective pulse generators 41 and 41'. These presence or trip pulses are also applied to counter 50 as shown diagrammatically.

It will be seen that I have described an improved hot-box detector having features of reliability and durability. My device can respond only to axle ends (that is, to those parts of journal boxes which are axially outside the side frames of the wheel trucks), and not to any other heat sources, no matter how intense. My device can also be integrated into conventional remote-indicating and control systems utilizing existing communication links, and thus provides means whereby traffic flow may be accelerated, maintenance improved, and costly hot-box losses substantially reduced.

While I have described the invention in detail for the preferred forms illustrated, it will be understood that modifications may be made within the scope of the invention as defined in the claim which follows.

I claim:

A railroad hot-box detector, comprising a length of track and separate trackside-mounted passive heat-responsive equipments, said equipments being mounted on opposite sides of the track at the same longitudinal location, each of said equipments including a heat-sensitive element and means directionally imaging said element at substantially the elevation of passing journal boxes, alarm means comprising separate threshold circuits, each threshold circuit being connected to a different heat-equipment output and effective to produce an alarm operation upon detection of a heat signal exceeding a predetermined threshold, coincidence-detecting means connected to both said threshold circuits and responsive to coincidence of operation of both threshold circuits and producing an alarm signal upon detection of such coincidence.

References Cited by the Examiner

UNITED STATES PATENTS

| | | | |
|---|---|---|---|
| 1,235,334 | 7/17 | Landis | 346—136 |
| 1,513,214 | 10/24 | Betts | 346—136 |
| 1,725,204 | 8/29 | Moorhead | 346—136 X |
| 1,787,536 | 1/31 | Hayes | 246—49 X |
| 1,850,978 | 3/32 | Sperry | 346—136 X |
| 1,901,209 | 3/33 | Vayda | 246—169 |
| 1,902,650 | 3/33 | Legg | 346—136 X |
| 2,045,923 | 6/36 | Reichard | 246—249 |
| 2,237,193 | 4/41 | Mobsby | 250—83.3 |
| 2,404,001 | 7/46 | Smith | 346—136 X |
| 2,441,065 | 5/48 | Green | 346—49 X |
| 2,486,546 | 11/49 | Austin | 246—169 |
| 2,502,215 | 3/50 | Giffen et al. | 346—49 X |
| 2,566,968 | 9/51 | Sorensen | 246—169 |
| 2,656,523 | 10/53 | Hodson et al. | 346—44 X |
| 2,774,887 | 12/56 | McMaster et al. | 250—83.3 |
| 2,816,234 | 12/57 | Ellis | 250—83.3 |
| 2,818,508 | 12/57 | Johanson et al. | 250—83.3 X |
| 2,818,732 | 1/58 | Bennett | 340—224 X |
| 2,856,539 | 10/58 | Orthuber et al. | 246—169 |
| 2,856,540 | 10/58 | Warshaw. | |

FOREIGN PATENTS

| | | |
|---|---|---|
| 601,748 | 8/34 | Germany. |
| 306,102 | 5/30 | Great Britain. |
| 817,805 | 7/59 | Great Britain. |
| 155,301 | 9/32 | Switzerland. |

OTHER REFERENCES

Railway Age, April 1, 1957, pages 47, 48 and 49.

EUGENE G. BOTZ, *Primary Examiner.*

ARTHUR GAUSS, LEO QUACKENBUSH, JAMES S. SHANK, *Examiners.*

UNITED STATES PATENT OFFICE
Certificate of Correction Patent No. 3,206,596  September 14, 1965

Sabert N. Howell

It is hereby certified that error appears in the above numbered patent requiring correction and that the said Letters Patent should read as corrected below.

In the Letters Patent (only), Sheets 1 and 2 of the drawings were inadvertently inserted and should be cancelled and the following inserted in lieu thereof:

Sept. 14, 1965   S. N. HOWELL   3,206,596
HOT BOX DETECTOR
Filed July 5, 1957   4 Sheets-Sheet 3

INVENTOR.
SABERT N. HOWELL
BY
ATTORNEYS

Sept. 14, 1965   S. N. HOWELL   3,206,596
HOT BOX DETECTOR
Filed July 5, 1957   4 Sheets-Sheet 4

FIG. 10A

INVENTOR
SABERT N. HOWELL
BY
ATTORNEYS

Signed and sealed this 8th day of February 1966.

[SEAL]

Attest:
ERNEST W. SWIDER,
*Attesting Officer.*

EDWARD J. BRENNER,
*Commissioner of Patents*